(Model.)

C. E. GIEBEL.
BRACE FOR CARRIAGE TOPS.

No. 264,452. Patented Sept. 19, 1882.

Witnesses
Morris E. Tyler
George M. Tyler

Inventor
Charles E. Giebel.

N. PETERS, Photo-Lithographer, Washington, D. C.

UNITED STATES PATENT OFFICE.

CHARLES E. GIEBEL, OF FREMONT, OHIO.

BRACE FOR CARRIAGE-TOPS.

SPECIFICATION forming part of Letters Patent No. 264,452, dated September 19, 1882.

Application filed May 29, 1882. (Model.)

*To all whom it may concern:*

Be it known that I, CHARLES E. GIEBEL, a citizen of the United States, residing at Fremont, in the county of Sandusky and State of Ohio, have invented a new and useful Improvement in Buggy-Top Joints, of which the following is a specification.

The object and nature of my invention is to secure a buggy-top joint which is adapted to all sizes of buggy-tops, and which, when the back-stays or the side of a buggy-top become loose, can be tightened up by any person without expense or the necessity of a visit to a shop. My invention does away with handmade buggy-top joints and furnishes buggy-top joints to manufacturers at a great saving of labor and expense.

Figure 1:
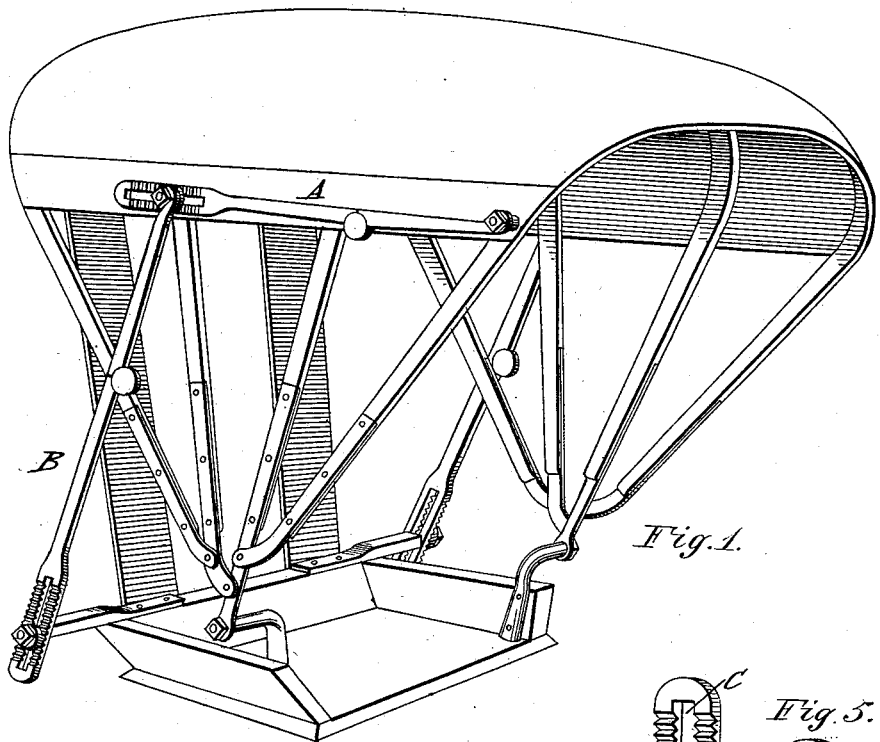
Figure 2:
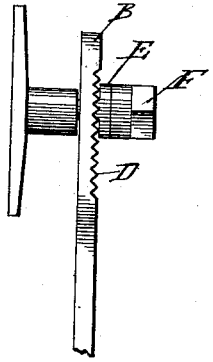
Figure 3:
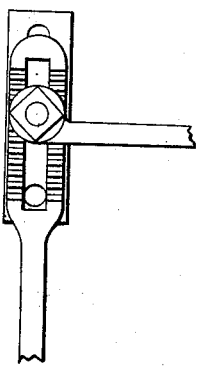
Figures 4, 5:
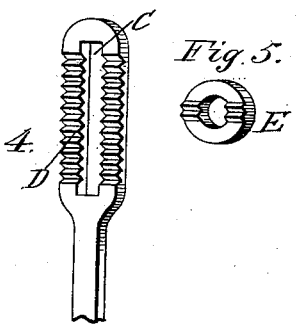

Figure 1 represents a buggy-top complete, with braces having slotted joints in accordance with my invention. Fig. 2 represents a side view of joint end and washer put together. Fig. 3 represents the slotted end of joint and the eye of the other end of joint, showing how both ends of joints are put together. Fig. 4 represents the ratchet-work on slot. Fig. 5 represents a washer with ratchet to fit ratchet on slot at the end of joint.

The following is a detailed description of my invention. It consists of a slot upon one end of every buggy-top joint; also a washer. The slot and washer have ratchet-work on one side, which ratchet-work can be made on the inside as well as on the outside of slot, with washer to fit either side.

This buggy-top joint can be made by being cast of malleable iron; also by machinery by using different iron.

The manner of using my invention is that whenever the back-stays on the sides of a buggy-top become loose it can be tightened up by removing the washer as many notches on the slot as may be necessary.

A and B represent the ordinary jointed braces which are applied to folding tops to hold such tops in their extended position. Each of these braces is provided at one end with a slot, C, and upon the surface with ratchet-teeth D.

E is a washer, also provided with teeth corresponding with the teeth D upon the braces. The slotted ends of the braces fit upon the studs upon the top and seat respectively, and may be adjusted thereon as desired, and are held in the adjusted position by means of the ratcheted washer and screw-nut F.

What I claim is—

The jointed-top brace, having in one end thereof a slot and ratcheted face, in combination with the stud, ratcheted washer, and screw nut, substantially as described.

CHARLES E. GIEBEL.

Witnesses:
   MORRIS E. TYLER,
   GEORGE M. TYLER.